(12) United States Patent
Wöhrle et al.

(10) Patent No.: US 9,007,447 B2
(45) Date of Patent: Apr. 14, 2015

(54) VEHICLE VISUAL DISPLAY SYSTEM

(75) Inventors: Philipp Wöhrle, Triberg (DE); Dave Ellis, New Palestine, IN (US); Curt Irons, Greenwood, IN (US); Ernie Latham-Brown, Blooming, IN (US)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1639 days.

(21) Appl. No.: 10/926,767

(22) Filed: Aug. 26, 2004

(65) Prior Publication Data

US 2005/0116943 A1    Jun. 2, 2005

(30) Foreign Application Priority Data

Aug. 28, 2003    (EP) ..................................... 03019499

(51) Int. Cl.
| | | |
|---|---|---|
| *H04N 7/18* | (2006.01) | |
| *B60R 11/02* | (2006.01) | |
| *B60R 11/00* | (2006.01) | |

(52) U.S. Cl.
CPC ..... *B60R 11/0235* (2013.01); *B60R 2011/0078* (2013.01)

(58) Field of Classification Search
USPC .................. 348/148, 61; 297/217.3, 391–410
See application file for complete search history.

(56) References Cited

U.S. PATENT DOCUMENTS

| | | | | |
|---|---|---|---|---|
| 5,669,668 | A * | 9/1997 | Leuchtmann | 297/408 |
| 6,006,462 | A * | 12/1999 | Lackomar | 40/593 |
| 6,183,335 | B1 * | 2/2001 | Petersen | 446/227 |
| 6,216,927 | B1 * | 4/2001 | Meritt | 224/275 |
| 6,663,155 | B1 * | 12/2003 | Malone et al. | 296/37.8 |
| 6,669,285 | B1 * | 12/2003 | Park et al. | 297/217.3 |
| 6,698,832 | B2 * | 3/2004 | Boudinot | 297/217.4 |
| 7,036,879 | B2 * | 5/2006 | Chang | 297/217.3 |
| 7,111,814 | B1 * | 9/2006 | Newman | 248/274.1 |
| 2003/0018975 | A1 * | 1/2003 | Stone | 725/105 |
| 2003/0025367 | A1 * | 2/2003 | Boudinot | 297/217.3 |
| 2003/0057339 | A1 * | 3/2003 | Watkins | 248/274.1 |

(Continued)

FOREIGN PATENT DOCUMENTS

| | | |
|---|---|---|
| DE | 94 07 193.4 | 4/1994 |
| DE | 101 20 465 A1 | 11/2002 |

(Continued)

OTHER PUBLICATIONS

Patent Abstracts of Japan vol. 015, No. 332 (C-0861), 23 aout 1991 & JP 03 128007A dated May 31, 1991.

*Primary Examiner* — Chikaodili E Anyikire
(74) *Attorney, Agent, or Firm* — Brooks Kushman P.C.

(57) ABSTRACT

A visual display device for vehicles and portable operation is provided, comprising a display arrangement for the display of data and a holding device for securing the display arrangement to the vehicle. Data and/or power may be provided either internally or externally through the holding device to the display arrangement. The visual display device is easily movable to accommodate the user's preferences, and may be transportable to locations other than the vehicle. Additionally, the visual display unit may function as a wireless terminal for an auxiliary television unit by receiving satellite or wireless transmissions and transmitting these to the auxiliary television unit. Methods for using the visual display device attached to a vehicle and as a portable unit are also provided, allowing for a wide range of data sources and internal power configurations.

51 Claims, 10 Drawing Sheets

(56) References Cited

U.S. PATENT DOCUMENTS

| | | | |
|---|---|---|---|
| 2003/0065560 A1* | 4/2003 | Brown et al. | 705/14 |
| 2003/0076453 A1* | 4/2003 | Ma | 349/50 |
| 2003/0121943 A1* | 7/2003 | Chou | 224/275 |
| 2003/0151590 A1* | 8/2003 | Pollard | 345/156 |
| 2003/0167105 A1* | 9/2003 | Colborn | 700/295 |
| 2004/0069826 A1* | 4/2004 | Neil | 224/543 |
| 2004/0080213 A1* | 4/2004 | Chang | 307/10.1 |
| 2004/0086259 A1* | 5/2004 | Schedivy | 386/46 |
| 2004/0145457 A1* | 7/2004 | Schofield et al. | 340/425.5 |
| 2004/0227861 A1* | 11/2004 | Schedivy | 348/837 |

FOREIGN PATENT DOCUMENTS

| | | |
|---|---|---|
| EP | 1 197 394 A2 | 9/2001 |
| EP | 1 260 412 A2 | 3/2002 |
| FR | 2 787 403 | 6/2000 |

* cited by examiner

US 9,007,447 B2

VEHICLE VISUAL DISPLAY SYSTEM

PRIORITY CLAIM

This application claims the benefit of EPO 03019499.7, filed Aug. 28, 2003. The disclosure of the above application is incorporated herein by reference.

BACKGROUND OF THE INVENTION

1. Technical Field

This application relates to a visual display unit for use in vehicles. In particular, this application relates to a display unit that is detachable from a vehicle mount and may be used as a wireless terminal for an external display.

2. Related Art

Display units for vehicles integrated into the back of seats or in the headrests of vehicles are known in the prior art. Pocket television sets attachable to vehicle seats by clamping clasps or Velcro strip fasteners are also known. However, both integrated display units and pocket television sets can only be used to a limited extent. Therefore, a need exists for a visual display unit that is easily adapted for use both in a vehicle and as a portable display unit.

SUMMARY

This application provides a display unit system for vehicles. The display unit may include a display arrangement and a holding device that is attachable to an inner structure in the vehicle such that the display unit can be used in a simple and versatile manner, while at the same time is easy to handle. The system also provides a method for using the display unit in a manner attached to a vehicle and a method for using the display unit as a portable device for viewing data.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
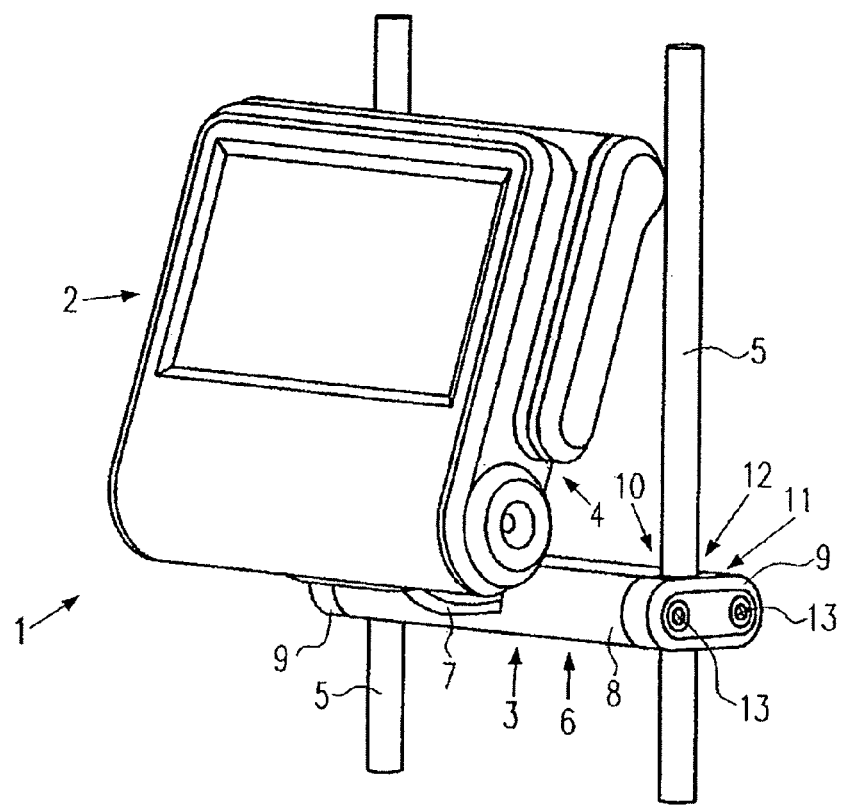
FIG. 1 shows a perspective view of a visual display unit for a vehicle.

FIG. 1 shows a display unit 1 for a vehicle according to the application comprising a display arrangement 2 and a holding device 3. The display arrangement 2 may be provided in a state detachably coupled to a coupling arrangement 4 of the holding device 3. The holding device 3 may be attached to an inner structure of a vehicle (not illustrated). As shown in FIG. 1, the inner structure is represented by headrest bars 5 of a vehicle seat (not illustrated). When the display arrangement 2 is attached to the holding device 3, the display arrangement 2 may be fixed to the inner structure of the vehicle in a stable manner. The inner structure of the vehicle may include the headrests of the vehicle seats, consoles in the vehicle, the dashboard, or any other surfaces available in the vehicle. The vehicle passengers may view visual presentations reproduced by the display arrangement 2. The holding device 3 may comprise an attachment part 6 by which the holding device 3 is attached to the headrest bars 5. The attachment part 6 may be connected to the coupling arrangement 4 of the holding device 3 via an arc shaped carrier member 7.

The attachment part 6 may comprise a central part 8 and holding jaws 9 detachably fixable on the outside. The central part 8 may have approximately semi-cylindrical recesses 10 on both sides on its outside, and the holding jaws 9 may each have approximately semi-cylindrical recesses 11 on their insides. However, other shapes may be used. When the holding jaws 9 are attached to the central part 8, a clamping bore 12 is formed by the semi-cylindrical recesses 10 and 11 through which a headrest bar 5, or other support mechanism within the vehicle, may be passed. The holding jaws 9 may be attached to the central part 8 by means of screws 13. By driving in the screws 13, the semi-cylindrical recesses 10 and 11 may be each brought to rest on the respective headrest bar 5 in a clamping manner.

The display arrangement 2 may be supplied with data and/or power via the holding device 3. The holding device 3 may be supplied with data and/or power via at least one of the headrest bars 5 or other support structures within the vehicle. Thus, the holding device 3 may be supplied with data and/or power in a space-saving manner and free from obstructions like freely guided cables. The display arrangement 2 may also contain an internal source of power in addition to an external source of power. Such sources of internal power include, but are not limited to, standard alkaline batteries, rechargeable internal batteries such as NiCd, NiMH, or Li cell batteries, solar cell power generation mechanisms, portable fuel cell devices, and mechanical power generation mechanisms such as wind-up crank power generation mechanisms.

The source of data provided to the visual display unit 1 may be cable-guided data like coaxial cable or RCA cable-directed transmission of television, radio, or Internet signals, or transmission of data stored on memory storage media such as CD, DVD, flash memory or hard-disk drive devices separate from the visual display device. The source of data may also be wireless signals such as radio, television, or satellite broadcasts of radio or television signals, wireless packet data such as WiFi or WiMax Internet signals, cellular telephone signals, and local area network transmissions such as X10, infrared, and Bluetooth transmissions. The carrier member 7 may be hollow, with electric cables being passed through the carrier member 7 from the attachment portion 6 to the coupling arrangement 4.

Figure 2:
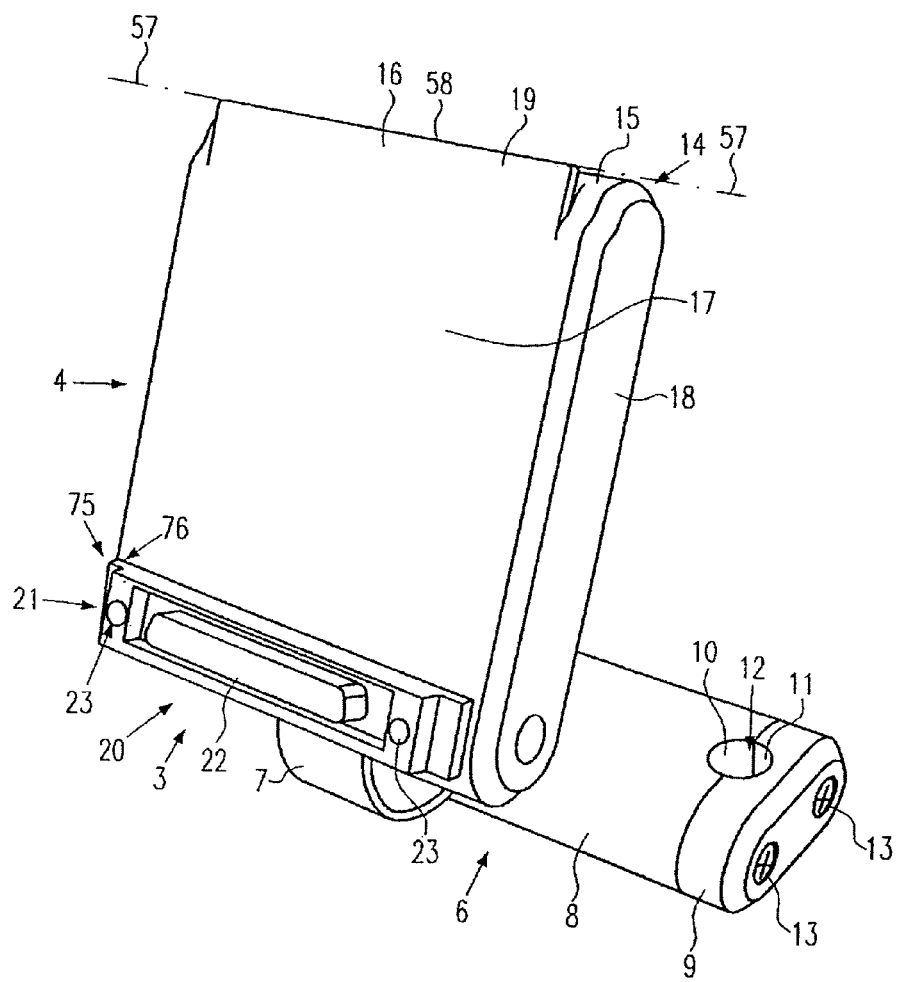
FIG. 2 shows a perspective view of a holding device of the visual display unit of FIG. 1.

In FIG. 2, the holding device 3 is illustrated in more detail. On its upper end 14, the coupling arrangement 4 may be provided with a bearing projection 16 extending parallel to an upper side 15. The bearing projection 16 may extend approximately wedge-shaped from the body 18 of the coupling arrangement 4 and may project over the upper side 15. An outside surface 19 of the bearing projection 16 may form a continuation of a coupling main surface 17 of the coupling arrangement 4. The coupling main surface 17 may be positioned on a side directly opposite of the display arrangement 2 in a coupled state. By the slot-like bearing joint (see description below regarding FIG. 4), the display arrangement 2 and the holding device 3 may be automatically positioned adjacent to one another when attached. The bearing joint may at least partially bear the weight of the display arrangement 2. The display arrangement 2 may be attached to the holding device 3 in a detachable manner and may be pivoted toward the holding device 3 when attached in a coupled position. In this manner, the display arrangement 2 can be easily attached to the holding device 3.

A detachable plug-type connector may be provided between the display arrangement 2 and the holding device 3 when in the coupled state. The plug-type connector forms a coupling force between the display arrangement 2 and the holding device 3. Thus, the display arrangement 2 can be attached to the holding device 3 by clipping the display arrangement 2 onto the holding device 3, and the display arrangement 2 remains fixed to the holding device 3 by the coupling force of the plug-type connector. A first plug-type connector 21 may be arranged to project approximately transversely from the coupling main surface 17 on a lower end 20 of the coupling device 4. The first plug-type connector 21 comprises a first plug part 22, which, as depicted in FIG. 2, may be a male electrical plug part. On the outside, next to the first plug part 22, first plug-type guides 23 are provided which, as depicted in FIG. 2, may be female mechanical plug-type recesses. At least one guiding member also may be provided on the display arrangement 2 and/or on the holding device 3. The guiding member guides the display arrangement 2 to the holding device 3 in a section-wise manner. This brings the display arrangement 2 and the holding device 3 at least section-wise into a defined position relative to one another when the display arrangement 2 and the holding device 3 are in a coupled state. In this manner, the insertion of the plug-type connector 21 may be facilitated.

Figure 3:
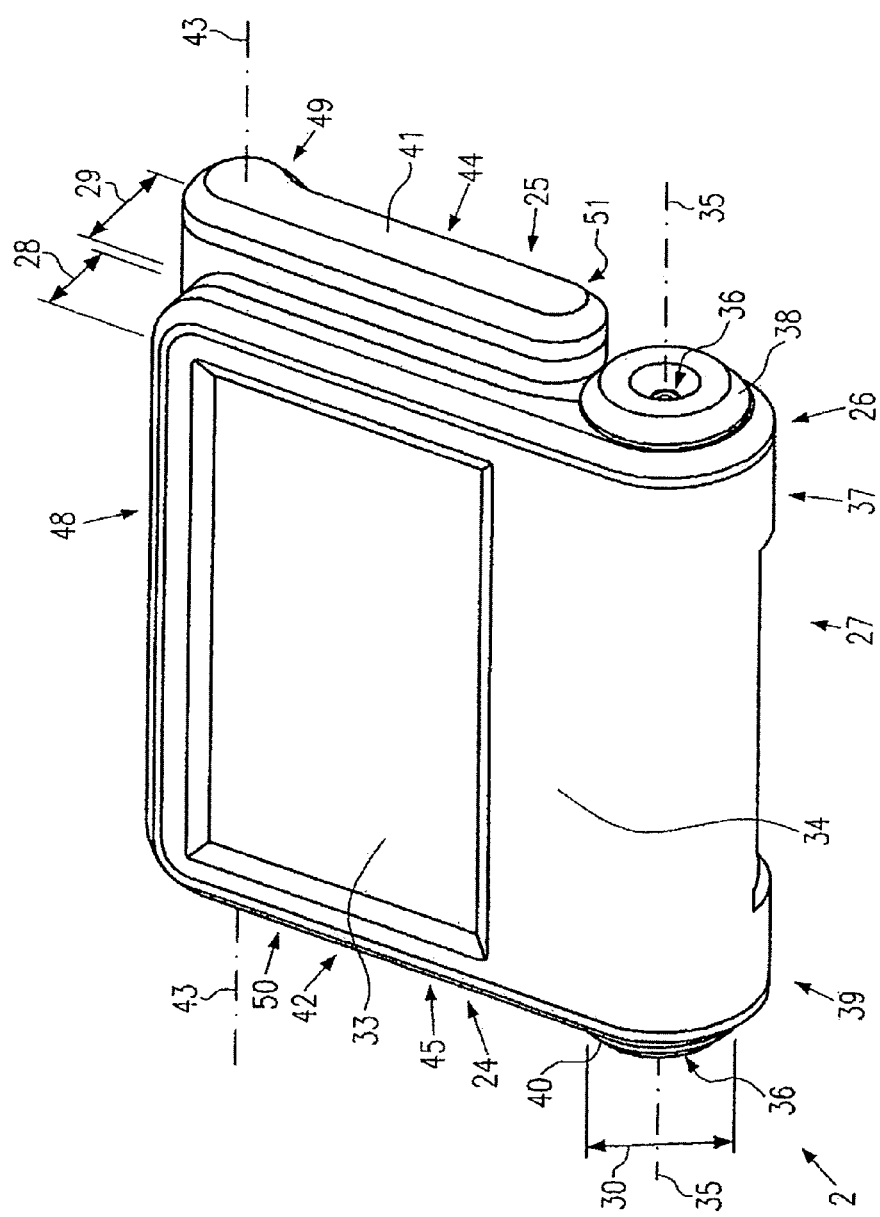
FIG. 3 shows a front perspective view of a display arrangement of the visual display unit of FIG. 1.

FIG. 3 shows the display arrangement 2 comprising a display module 24 and a base module 25 which, along a mutual side 27, may be pivotably connected with each other via a pivoting joint 26. The pivoting joint 26 thereby forms a pivoting axis about which the display module 24 and the base module 25 may pivot. FIG. 3 shows the display module 24 and the base module 25 in a state folded parallel to each other. The thickness 28 of the display module 24 and the thickness 29 of the base module 25 are thereby together approximately equal to the diameter 30 of the pivoting joint 26 alternatively. The thicknesses 28 and 29 together also may be smaller than the diameter 30 of the pivoting joint 26. The display module 24 can be brought into a desired orientation with respect to the viewing direction of a viewer, either when the display arrangement 2 is operated separately from the vehicle, or when the display arrangement 2 is attached to the holding device 3. This allows different spatial positions for the base module 25.

Figure 8:
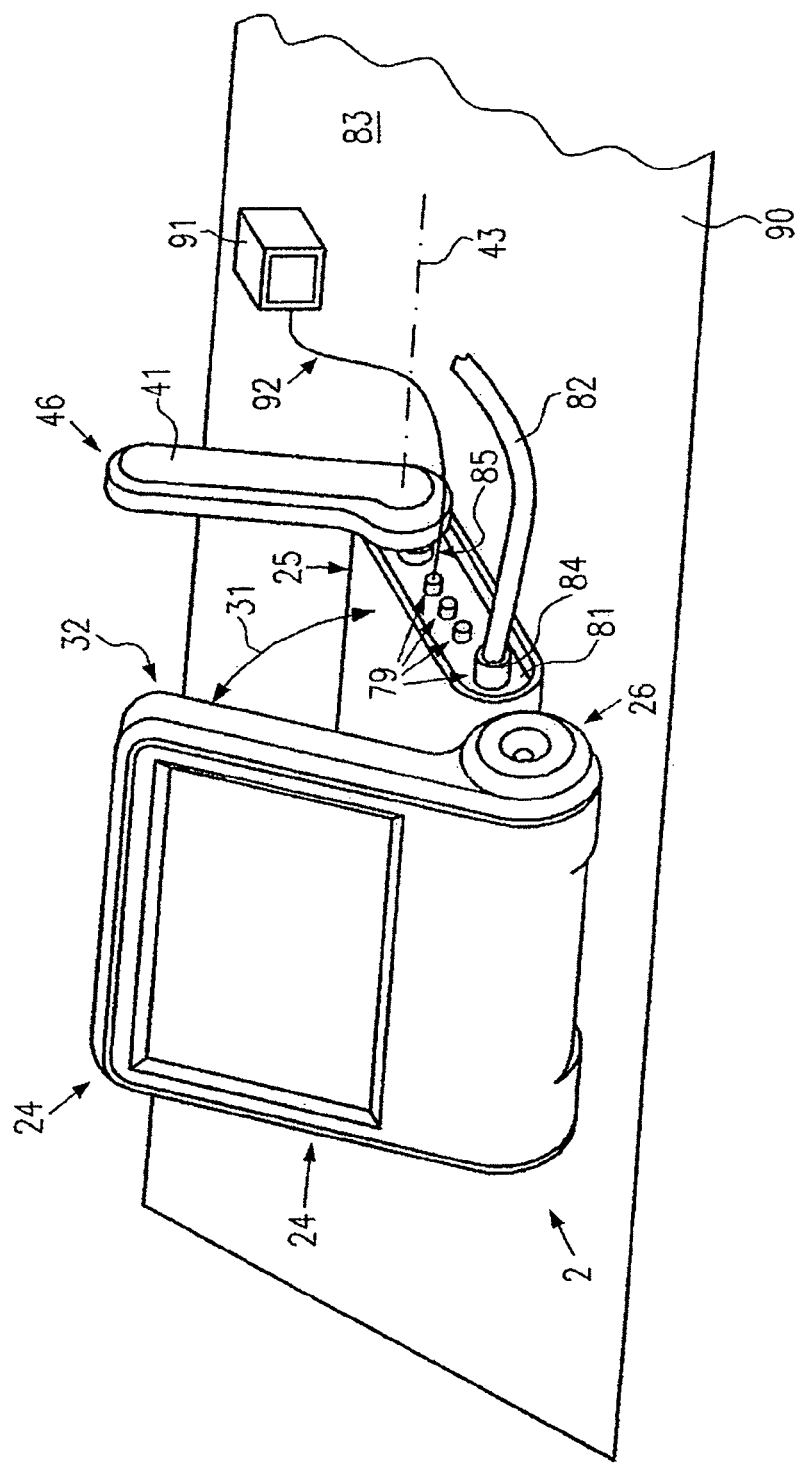
FIG. 8 shows a perspective view of the display arrangement in a separate, uncoupled state.

In a folded state, the display module 24 and the base module 25 may be adjacent to each other. Thus, the unit consisting of the display module 24 and the base module 25 takes up little space in the folded state. In the state folded parallel to one another, the display module 24 and base module 25 are approximately aligned with the joint 26, or are mounted below the pivoting joint 26. In an unfolded state, as is shown in FIG. 8, the display module 24 and the base module 25 may, for instance, enclose an acute or an approximately right angle 31 with each other. The angle 31 is thereby understood as an angle between a rear side 32 of the display module 24 and the base module 25. The display module 24 may then be supported by the base module 25 on a surface, such as a desk, in a tilt-resistant manner when the display arrangement 2 is operated separately.

As can further be seen in FIG. 3, the display module 24 may include a display 33 on the front side 34. On the outside of the housing, a headset contact 36 may be provided approximately coaxially to a pivoting axis 35 of the pivoting joint 26. Thus, when the display module 24 and the base module 25 are pivoted, the headset contact 36 maintains its spatial position relative to both the display module 24 and the base module 25. Moreover, a volume control 38 may be provided on the outside of the housing on a right-hand side 37 of the display arrangement 2 approximately coaxially to the pivoting axis 35. Thus, when the display module 24 and the base module 25 are pivoted relatively, the volume control 38 maintains its position relative to both the display module 24 and the base module 25. As depicted in FIG. 3, the volume control 38 is rotatable approximately about the pivoting axis 35. On the outside of the housing, a menu selector 40 is arranged on a left-hand side 39 of the display arrangement 2 approximately coaxially to the pivoting axis 35. The menu selector 40 may be, as shown in FIG. 3, rotatable approximately about the pivoting axis 35.

On both of the right-hand and the left-hand sides 37 and 39 of the display arrangement 2, an antenna 41 and 42 may be provided on the outside of the base module 25. The antenna 41 and 42 is easy to grasp and handle. The first and second antenna 41 and 42 may each, separately from each other, be pivotable between a retracted position 44 and 45 and an extended position 46 and 47 (sec FIG. 6) about an antenna pivoting axis 43 parallel to the pivoting axis 35 of the pivoting joint 26. Thus, the antenna 41 and 42 can easily be brought from one position to another. In FIG. 3, both the first antenna 41 and the second antenna 42 are in their retracted positions 44 and 45. In their retracted positions 44 and 45, the antennas 41 and 42 may each form an integral outer shape of the base module 25 and cover contacts and/or switches.

The antenna pivoting axis 43 may be positioned in the region of an outer side 48 of the base module 25 which may be placed opposite the pivoting joint 26. In the region of the antenna pivoting axis 43, the antennas 41 and 42 are each enlarged in an approximately arc-shaped manner. The enlargements 49 and 50 may extend in the direction toward a rear side 51 of the base module 25. The rear side 51 of the base module 25 may face away from the display module 24 when the display arrangement 2 is in a folded state.

Figure 4:
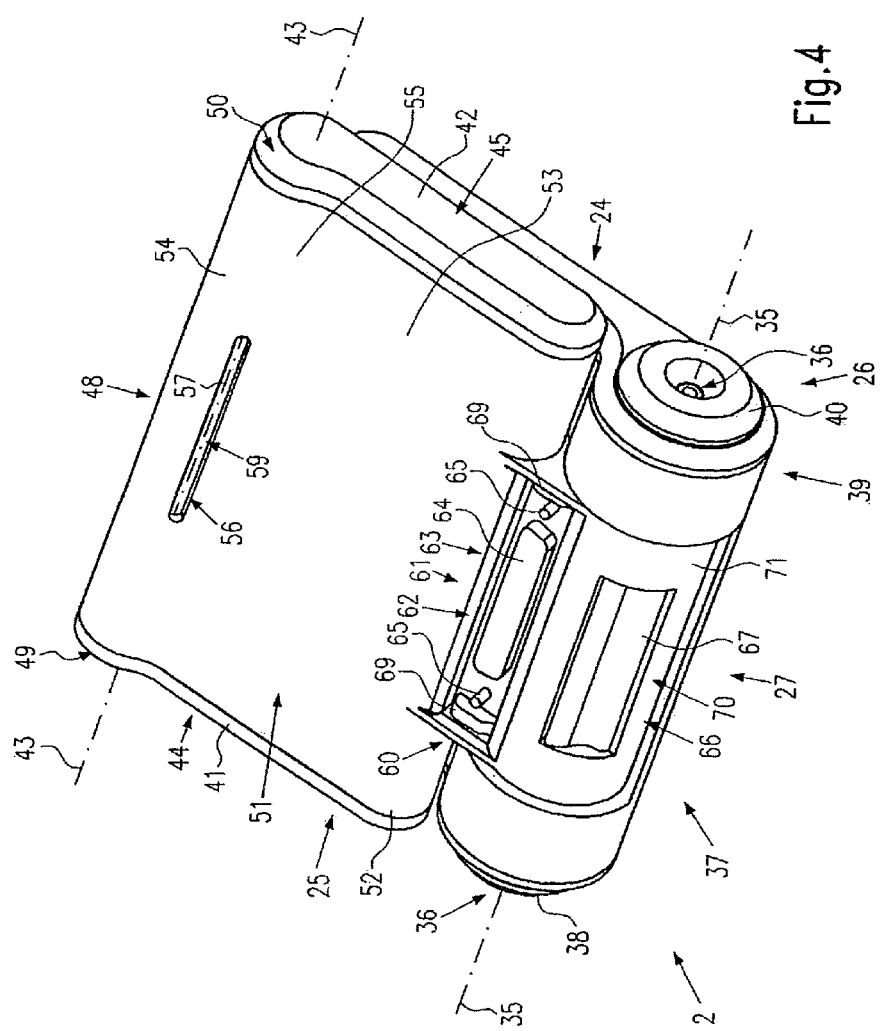
FIG. 4 shows a perspective rear view of the visual display arrangement of FIG. 3.

FIG. 4 shows a perspective rear view of the display arrangement 2 in a folded state. The rear side 51 of the base module 25 is also shown. The rear side 51 may have a flat area 53 between the outside 48 of the base module 25 and a joint side 52 of the base module 25. Adjacent to the flat area 53, an approximately rounded-off bulge 54 may be provided on the rear side 51 in the region of and parallel toward the outside 48. The bulge 54 ends approximately transversely to the outside of the flat area 53. Adjacent to the flat area 53, the bulge 54 comprises a rounded-off groove 55. The enlargements 49 and 50 of the antennas 41 and 42 correspond to the bulge 54 of the groove 55.

A longitudinal recess 56 may be formed approximately in the center of the area of the groove 55 parallel to the groove 55 and the bulge 54. The recess 56 may be approximately slot-shaped. The bearing projection 16 of the coupling arrangement 4 can be inserted at least section-wise into the recess 56. Thus, the display arrangement 2 can be attached to the holding device 3. Accordingly, when the display arrangement 2 may be detachably attached to the holding device 3, the recess 56 of the base module 25 and the bearing projection 16 of the coupling arrangement 4 may form an approximately slot-like bearing joint.

The slot-like bearing joint allows the display arrangement 2 to pivot relative to the holding device 3 about a bearing axis 57. The bearing axis 57 extends approximately throughout the bottom face 59 of the recess 56 on the side of the base modules 25 and approximately throughout the region of an upper edge 58 of the bearing projection 16 of, the coupling arrangement 4. The upper edge 58 comes to rest on the bottom face 59 of the recess 56. When the display arrangement 2 is attached to the holding device 3, it can be pivoted toward the holding device 3 about the bearing axis 57.

Between a joint side 52 of the base module 25 and the pivoting joint 26, there exists a joint connection 60. In a central portion 61, the joint connection 60 may be recessed. A second plug-type connector 63 may be provided in the recess 62. The second plug-type connector 63 comprises a second plug part 64 which, according to FIG. 4, may be a female electric plug part mating with the first plug part 22 of the coupling arrangement 4. The first plug part 22 can be inserted at least section-wise into the second plug part 64. Second plug-type guides 65 may be arranged on the outside of the second plug part 64. The second plug-type guides 65 may be, according to FIG. 4, approximately pin-like male mechanical plug-type guides mating with the first plug-type guides 23 of the coupling arrangement 4. The second plug-type guides 65 can at least be inserted section-wise into the first plug-type guides 23. In this manner, a detachable ping-type connection of the display arrangement 2 and the holding device 3 can be accomplished with the aid of the first plug-type connector 21 of the coupling arrangement 4 and the second plug-type connector 63 of the base module 25. For plugging the first and the second plug-type connectors 21 and 63 together, a clamping force of the plug-type connection must be generated, which constitutes a coupling force of the plug-type connection. The coupling force prevents an unintentional disengagement of the display arrangement 2 from the holding device 3. According to this arrangement, the coupling force may be generated by the first and second plug part 22 and 64. To disengage the first and second plug-type connectors 21 and 63 from each other, the coupling force of the plug-type connection must be overcome.

The base module 25 comprises a release device 66 in the region of the pivoting joint 26 and the joint connection 60. The release device 66 may be approximately lever-shaped and may extend section-wise into the interior of the base module 25. The display arrangement 2 can be then brought into a position relative to the holding device 3, in which the display arrangement 2 can be detached from the holding device 3. The release device 66 comprises a first lever section 67 formed in an operating key-type manner and located opposite a second lever section. The second lever section comprises two push-cams 69. The release device 66 may be operable with a first lever section 67, and the display arrangement 2 may be released out of the coupled position with a second lever section. The lever thereby serves as a transmission gear.

The first lever section 67 may be exposed and freely accessible due to an opening 70 in the central area of a part 71 of the pivoting joint 26 on the side of the base module 25. The push-cams 69 project at least section-wise into the inner region of the recess 62 of the joint connection 60, and are each located on the outside of the second plug-type connector 63.

The release means 66 can be pivoted between a retracted position and a released position about a release means pivoting axis (not illustrated), extending approximately parallel to the pivoting axis 35 in the interior of the base module 25. FIG. 4 shows the release means 66 in its retracted position.

Figure 5:
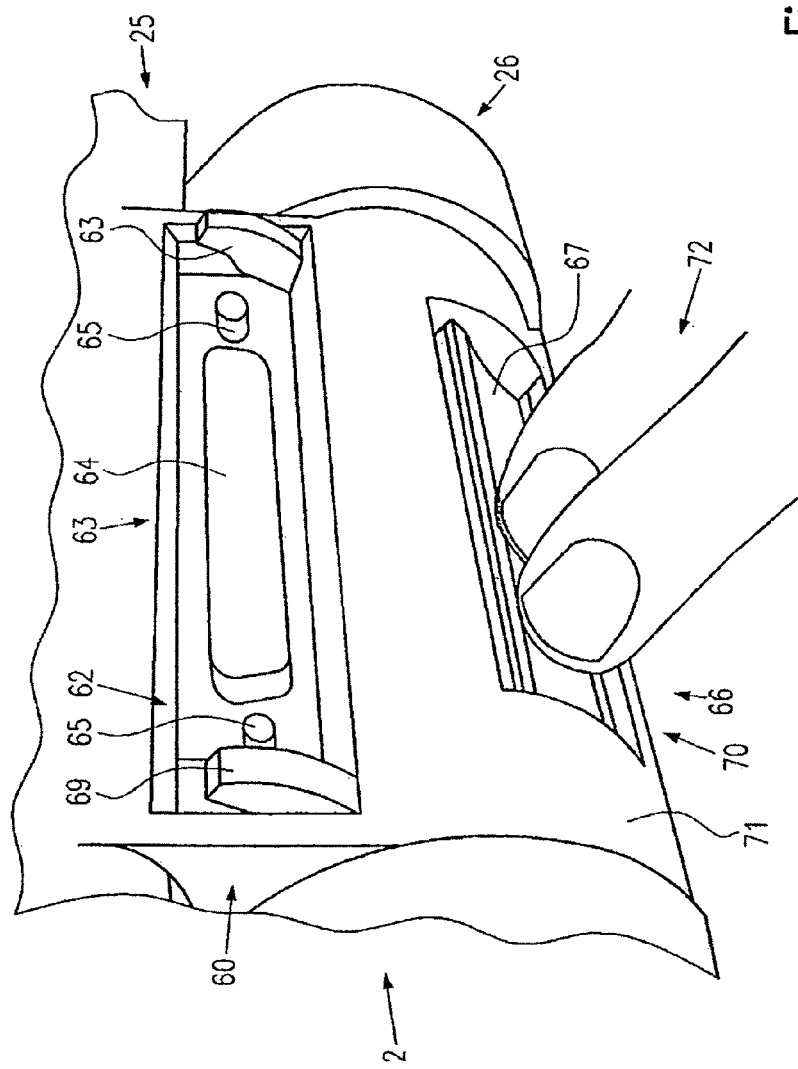
FIG. 5 shows an extract of a view of a release means of the display arrangement in an operated state.

FIG. 5 shows a section of the display arrangement 2, with the release means 66 in its released position. The release means 66 may be thereby moved into the released position against a spring force of an adjustment spring (not illustrated) by pressing fingers 72 onto the first lever section 67. In the released position, the first lever section 6'7 may be positioned deeper in the opening 70 than in the retracted position of the release means 66. Moreover, in the released position, the push-cams 69 each project at least section-wise over the joint connection 60 and out of the recess 62.

Figure 6:
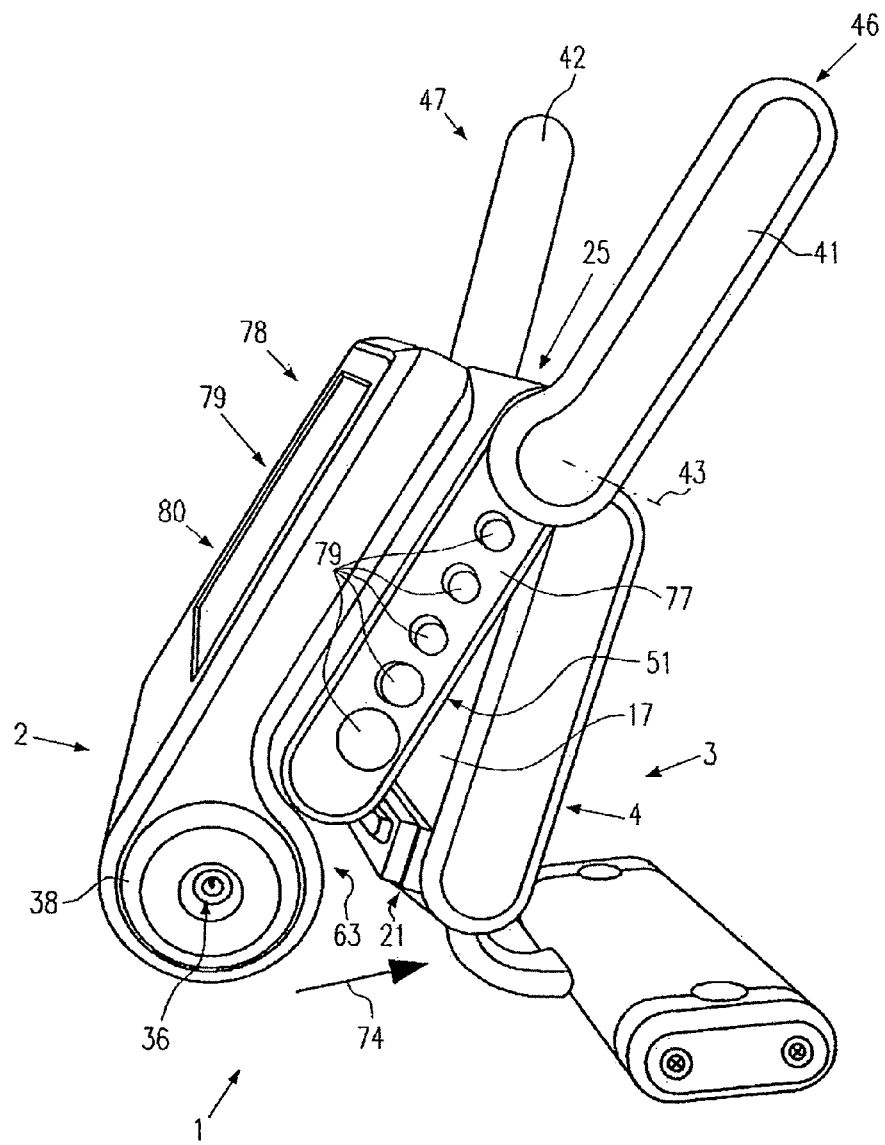
FIG. 6 shows a representation of the fastening process of the display arrangement on the holding device.
Figure 7:
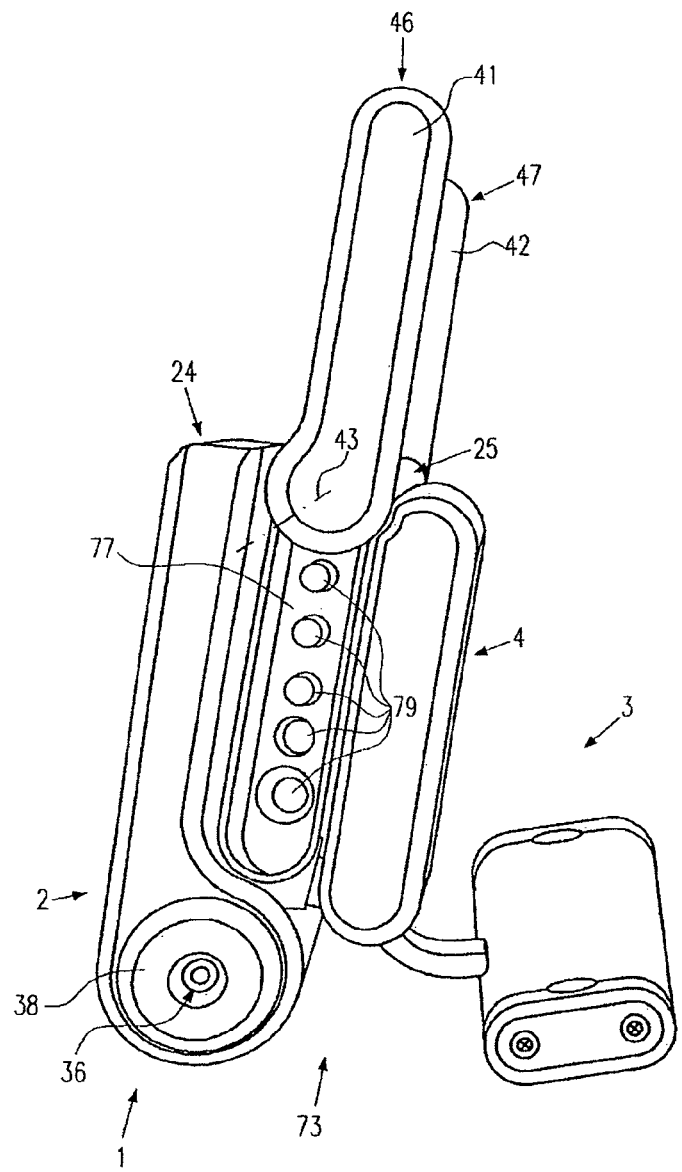
FIG. 7 shows a lateral view of the display unit for a vehicle, with the display arrangement attached to the holding device.

FIG. 6 shows the display arrangement 2 in a position attached to the holding device 3. The rear side 51 of the base module 25 and the coupling main surface 17 of the coupling arrangement 4 still enclose an acute angle between each other. By pivoting the display arrangement 2 toward the holding device 3, the display arrangement 2 may be brought into its coupled position 73, as is shown in FIG. 7. In the coupled position 73, the display arrangement 2 may be attached to the holding device 3, and the rear side 51 (from FIG. 6) of the base module 25 may be positioned approximately in a co-planar alignment to the coupling main surface 17 of the coupling device 4. The plug-type connection may be produced by means of the first and second plug-type connectors 21 and 63.

The outward pivoting movement of the display arrangement 2 into its coupled position 73 may be accomplished in a direction of the arrow 74 illustrated in FIG. 6. When the first and the second plug-type connectors 21 and 63 engage with each other, the second plug-type guides 65 are introduced into the first plug-type guides 23, whereby—in this last section of the approaching pivoting movement—the pivoting movement of the display arrangement 2 may be guided in a directed manner relative to the holding device 3. When guiding the first and second plug-type guides 23 and 65, the first and second plug parts 22 and 64 are plugged together by overcoming the coupling force.

The display arrangement 2 may be released out of its coupled position 73 by actuating the release means 66 through the fingers 72, which is shown in FIG. 5. The push-cams 69 may thereby each push against pushing surfaces 75 provided on the outside, adjacent to the first plug-type connector 21 (compare with FIG. 2). The pushing surfaces 75 may be formed on lateral shoulders 76 approximately co-planar to the coupling main surface 17 of the coupling arrangement 4. The lateral shoulders 76 may project approximately perpendicularly over the coupling main surface 17 and are formed integrally with the first plug-type connector 21.

By pushing the push-cams 69 against the pushing surface 75, a force may be produced, directed opposite to the direction of arrow 74 shown in FIG. 6, pushing the display arrangement 2 relatively away from the holding device 3. Through this force, the coupling force may be overcome and the display arrangement 2 may be displaced back into a state attached to the holding device 3. From this attached state, the display arrangement 2 may be brought into a separated state by unhinging the bearing projection 16 from the recess 56.

FIGS. 6 and 7 show the antennas 41 and 42 in extended positions 46 and 47, the extension accomplished by separately rotating each of the antennas 41 and 42 about the antenna pivoting axis 43. In their extended positions 46 and 47, the antennas 41 and 42 extend away from the base module 25. In the extended positions 46 and 47 of the antennas 41 and 42, recesses 77 and 78, with contacts 79 and/or switches 80 arranged within the recesses 77 and 78, are exposed on both sides of the base module 25. The contacts 79 may be audio inputs and/or outputs. This may allow for various forms of inputs to and outputs from the display arrangement 2 in the exposed areas, such as cable-directed media input or output. In such a configuration, the visual display device may receive radio or coaxial cable directed media from television or disk media like CD's or DVD's, flash memory devices, hard-disk drive devices, and packet data such as Internet transmissions. The visual display unit 1 in such a configuration may also output signals such as television signals to external devices like other display units, external display monitors, or other electronic entertainment or data devices. A power supply input may be provided, and one switch may be an ON/OFF switch of the display arrangement 2.

The antennas 41 and 42 may be detachable. When detached, external antenna contacts are exposed, each contact provided on the base module 25 approximately coaxially to the antenna pivoting axis 43. The display arrangement 2 can be supplied with external antenna signals via these external antenna contacts. Such external signals may be broadcast transmissions such as radio, television, satellite broadcasts of radio and/or television, or wireless packet data such as wireless Internet or cellular telephone signals. The antenna contact may also supply the display arrangement 2 with signals from local computer networks such as local area networks (LANs), X10 network signals, infrared signal transmissions, or Bluetooth transmissions to and from other devices located within the vicinity of the visual display device 1. The antenna contact may be accessible with the antenna 41 and 42 removed from the antenna contact. This ensures that the antenna 41 and 42 of the display arrangement 2 and an external antenna are used alternatively only.

FIG. 8 shows the display arrangement 2 separated from the holding device 3, with the display module 24 unfolded with respect to the base module 25. The base module 25 lies with its underside approximately flat on a table plate 90. In this manner, the display unit 1 may be used, for example, as a table unit. Thus, a user may use it on a desk or other surface and, if desired, also install it in the vehicle on the holding device 3. The first antenna 41 may be in an extended state 46, with the longitudinal direction of the antenna 41 extending approximately transversely to a surface 83, on which the display arrangement 2 stands. From the exposed contacts 79 of the recess 77, one contact 79 arranged adjacent to the pivoting joint 26 may be formed as a main feed terminal 81. A main cable 82 may be plugged into this main feed terminal 81 through its main feed plug 84. The display arrangement 2 may be thus supplied with external power. Other contacts 79 may be used for input and/or output signal feeds, including, for example, coaxial and/or RCA cables for supplying a source of data to or from the visual display device.

In addition, FIG. 8 shows an antenna joint 85 of the first antenna 41. The first antenna 41 may be movable about the antenna pivoting axis 43 with the aid of the antenna joint 85. If the first antenna 41 may be removed, an external antenna contact arranged in the inner region of the antenna joint 85 may be accessible and the external antenna contact may be used for signal feeds such as data sources directed by coaxial or RCA cable. Such signal feeds include, but are not limited to, radio, television, telephone, Internet and other packet switched data.

When in an uncoupled state, as is illustrated in FIG. 8, a satellite signal, such as in a digital form, may be received via antenna 41. The display arrangement 2 may be used as a satellite receiver for an additional television set. Thus, the display arrangement 2 may be used in terms of an auxiliary device for the additional television set, where it may receive satellite signals and transmit them to the additionally connected television set, via a video output. To accomplish this, the antenna 41 may, if necessary, receive the data—such as digital data—and pass it on to the television set. Thus, the display arrangement 2 may serve as a wireless terminal for an external display of the television set. As mentioned above, the display arrangement 2 may also receive wireless signals such as radio, television, wireless packet data such as WiFi or WiMax Internet signals, cellular telephone signals, and local area network transmissions such as X10, infrared signal, and Bluetooth transmissions. Via the video output 79, the base module 25 may be connected via a line 92 to an external television set 91, which is only shown schematically and may correspond to a complete television and/or video system. In this case, the display unit 1 serves as a satellite receiver which, when connected with the television set 91 in the form of an auxiliary device, may supply the data for the operation of the television set 91. Through the antennas 41 (and/or 42), the display arrangement 2 may serve as a wireless terminal. Examples of wireless signals include signals from local computer networks such as local area networks (LANs), X10 network signals, WiFi or WiMax signals, infrared, or Bluetooth transmissions to and from other devices located within the vicinity of the visual display device.

The application used as a display unit for vehicles need not necessarily be attached in a vehicle such as a car. Other applications may include stationary locations upon which the visual display device may be attached. In these applications, the display unit may be used as a mobile display unit, which can be brought from the coupled state into the uncoupled state, and vice versa.

Figure 9:
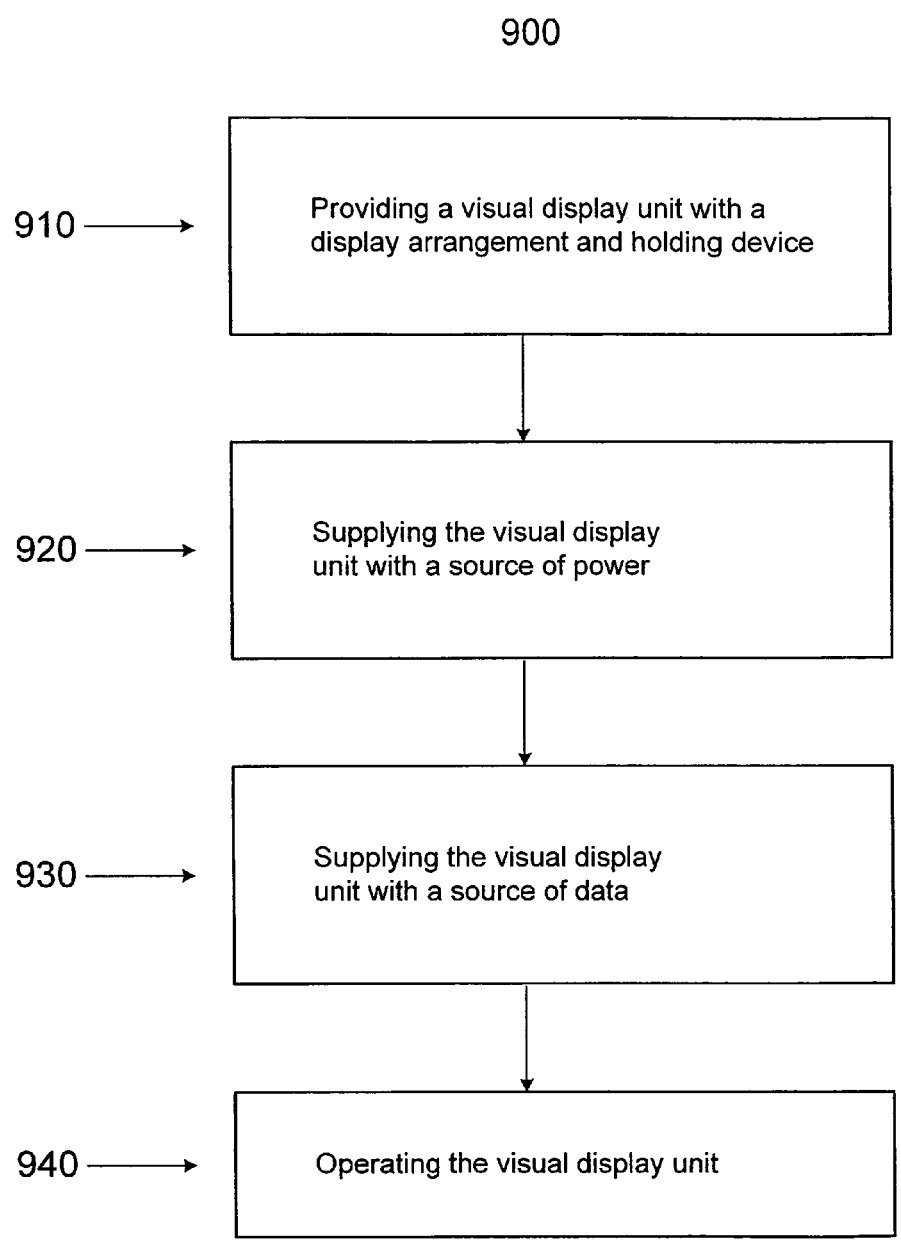
FIG. 9 shows a flow diagram depicting a method for using the visual display device in a coupled configuration.

In FIG. 9, a method for using the visual display device in a vehicle is shown 900. First, a visual display device 1 (see FIG. 1) comprising a display arrangement 2 and a holding device 3 may be provided 910. Second, the visual display device 1 may be supplied with a source of power, whether internal or external 920. The visual display device 1 may be capable of being supplied with an external source of power, in addition to having its own source of power supplied internally. The external power may be supplied through contacts 79 (see FIG. 6) provided on the visual display device 1. Third, the visual display device 1 may be supplied with a source of data to be displayed on the visual display unit 930. The visual display device 1 may be capable of being supplied with an external source of data, in addition to having its own source of data supplied internally. The external data may be supplied through contacts 79 (see FIG. 6) provided on the visual display device 1. Fourth, the visual display device 1 may be operated 940, displaying the data supplied to the visual display device 1.

Figure 10:
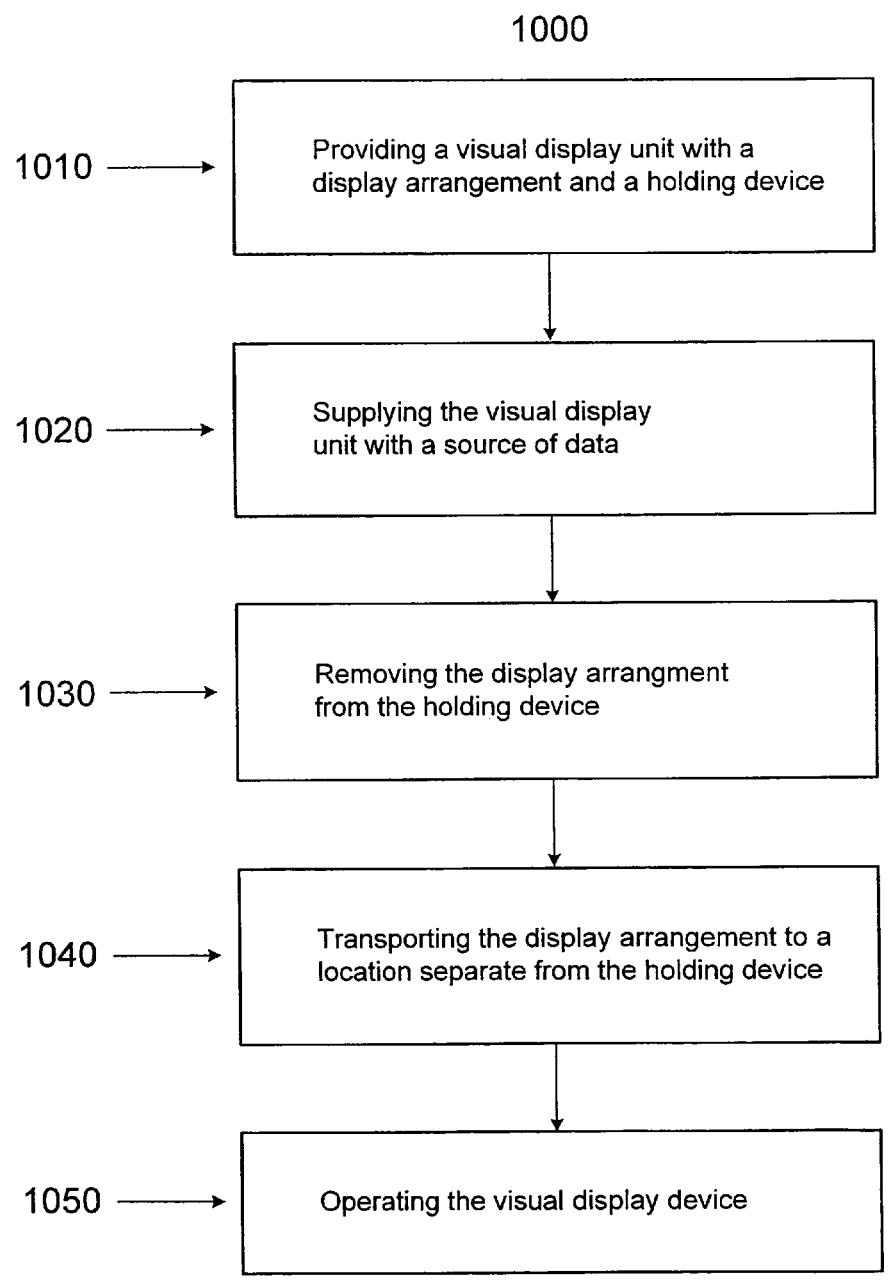
FIG. 10 shows a flow diagram depicting a method for using the visual display device in an uncoupled, portable configuration.

In FIG. 10, a method for using a visual display device in a portable manner is shown 1000. First, a visual display device 1 (see FIG. 1), comprising a display arrangement 2 and a holding device 3, is provided 1010. Second, the visual display device 1 may be supplied with a source of data 1020, whether internally supplied or externally supplied. Third, the display arrangement 2 may be removed 1030 from the holding device 3. Fourth, the display arrangement 2 may be transported 1040 to a location separate from the holding device 3. Fifth and finally, the display arrangement 2 may be operated by displaying the supplied data 1050. Alternatively, the supplying of data 1020 may be performed just prior to the operation 1050, transport 1040, or removal 1030 of the display arrangement 2 from the holding device 3. In addition, the display arrangement 2 may alternatively already be uncoupled from the holding device 3, which eliminates the need for removing 1030 the display arrangement 2 from the holding device 3.

In each of the methods 900 and 1000 presented above, the source of data may be cable-guided data like coaxial cable or RCA cable-directed transmission of television, radio, or Internet signals, or transmission of data stored on a memory storage medium such as CD, DVD, flash memory or hard-disk drive devices separate from the visual display device. The source of data may also be wireless signals such as radio, television, or satellite broadcasts of radio or television signals, wireless packet data such as WiFi or WiMax Internet signals, cellular telephone signals, and local area network transmissions such as infrared interfaces, X10 and Bluetooth transmissions. The visual display unit may have an internal source of power, which may be in addition to an external source of power. Such sources of internal power include, but are not limited to, standard alkaline batteries, rechargeable internal batteries such as NiCd, NiMH, or Li cell batteries, solar cell power generation mechanisms, portable fuel cell devices, and mechanical power generation mechanisms such as wind-up crank power generation mechanisms.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A visual display unit for a vehicle comprising:
 a holding device attachable to headrest bars of the vehicle and including:
  a central part configured to be positioned between the headrest bars and including respective recesses at opposite ends of the central part;
  holding jaws respectively detachably connected to the opposite ends to couple the holding device with the headrest bars in a clamping manner, the holding jaws including respective recesses facing the corresponding recesses of the central part, where the recesses of the holding jaws and the corresponding recesses of the central part form respective clamping bores through which the headrest bars pass; and
  a coupling arrangement including a first connector; and
 a display arrangement for displaying data and including a portable display module and a second connector detachably coupled to the first connector, where the display arrangement is detachably coupled to the holding device via the first connector and the second connector, and the display arrangement when detached is configured to be operable for displaying data independently of the vehicle, wherein the holding device is configured to remain attached to the headrest bars when the display arrangement is detached from the holding device.

2. The visual display unit of claim 1, where the display arrangement is supplied with data, power, or both data and power via the holding device.

3. The visual display unit of claim 2, where the holding device is supplied with data, power, or both data and power that is transmitted through at least one cable alongside or through at least one of the headrest bars.

4. The visual display unit of claim 2, where the display arrangement is attachable to a pivot location of the holding device separate from the first connector and, in an attached state, is pivotable toward the holding device from an uncoupled position at which the first connector and the second connector are uncoupled and at an angle to each other relative to the pivot location, and into a coupled position at which the first connector and the second connector are coupled.

5. The visual display unit of claim 4, where the pivot location is a slot-like bearing joint.

6. The visual display unit of claim 2, where the first connector and the second connector form a detachable plug-type connection in a coupled state, and the detachable plug-type connection forms a coupling force between the display arrangement and the holding device.

7. The visual display unit of claim 2, where a guiding member is provided on at least one of the display arrangement and the holding device, with which the coupling of the display arrangement to the holding device is at least section-wise guidable in a directed manner.

8. The visual display unit of claim 2, where at least one of the display arrangement and the holding device comprises a release device, with which the display arrangement is at least section-wise releasable from its coupled position, and the display arrangement is uncoupled from the holding device.

9. The visual display unit of claim 8, where the release device is formed in a lever-like manner and is operable with a first lever section, and where the display arrangement is releasable out of the coupled position with a second lever section.

10. The visual display unit of claim 2, where the display arrangement comprises a base module which is pivotably connected with the portable display module along a mutual side, forming a pivoting axis and a joint.

11. The visual display unit of claim 10, where the portable display module is provided adjacent to the base module in a folded state.

12. The visual display unit of claim 10, where a thickness of the portable display module and the base module are smaller than or approximately equal to a diameter of the joint when the display module and base module are folded parallel to each other.

13. The visual display unit of claim 11, where the base module is located at a rear side of the portable display module in an unfolded state and where the base module encloses an acute or approximately right angle with the portable display module.

14. The visual display unit of claim 11, where at least one headset contact is provided outside a housing of the display module approximately coaxially to the pivoting axis of the display module and the base module.

15. The visual display unit of claim 14, further comprising a volume control provided outside the housing approximately coaxially to the pivoting axis of the display module and the base module.

16. The visual display unit of claim 15, further comprising at least one antenna which forms an integral outer shape of the display arrangement in a retracted position and projects from the integral outer shape in an extended position.

17. The visual display unit of claim 16, where the antenna is pivotable between the retracted and the extended position.

18. The visual display unit of claim 17, where the antenna is detachable.

19. The visual display unit of claim 18, further comprising an antenna contact for an external antenna where the antenna contact is approximately coaxial to a pivoting axis of the antenna.

20. The visual display unit of claim 19, where the antenna contact is accessible when the antenna is detached.

21. The visual display unit of claim 20, where the display arrangement is operable in an uncoupled state when placed on a flat base.

22. The visual display unit of claim 20, where the display arrangement is adapted as a satellite receiver for an additional television set.

23. A method for using a visual display unit for a vehicle, the method comprising:
   a) providing a visual display unit including:
      a holding device attachable to headrest bars of the vehicle, the holding device including:
         a central part positioned between the headrest bars and including respective recesses at opposite ends of the central part;
         holding jaws respectively detachably connected to the opposite ends to couple the holding device with the headrest bars in a clamping manner, the holding jaws including respective recesses facing the corresponding recesses of the central part, where the recesses of the holding jaws and the corresponding recesses of the central part form respective clamping bores through which the headrest bars pass; and
         a coupling arrangement including a first connector; and
      a display arrangement including a portable display module and a second connector detachably coupled to the first connector, where the display arrangement can detachably be coupled to a coupling arrangement of the holding device and is separately operable in an uncoupled state;
   b) providing a source of power to the visual display unit;
   c) providing a source of data to the visual display unit; and
   d) operating the visual display unit to display the source of data, wherein the holding device is configured to remain attached to the headrest bars when the display arrangement is detached from the holding device.

24. The method claim 23, where the data is provided with at least one cable alongside or through at least one of the headrest bars.

25. The method of claim 23, where the source of data is selected from the group consisting of a radio signal broadcast, a satellite signal broadcast, a wireless data transmission source, a DVD audio stream, a DVD video stream, a CD audio stream, a CD video stream, a memory storage medium, and a combination of two or more of the foregoing.

26. The method of claim 23, where the source of data comprises a satellite signal broadcast selected from the group consisting of a television broadcast and a radio broadcast.

27. The method of claim 23, where the source of data comprises a wireless transmission source selected from the group consisting of a cellular phone signal, a wireless packet data source, and a television broadcast.

28. The method of claim 23, where the source of data comprises a wireless packet data source selected from the group consisting of a wireless Internet packet transmission, a local area network, a source provided by a Bluetooth interface, a source provided by an X10 interface, and a source provided by an infrared transmission interface.

29. A method for using a visual display unit for a vehicle, the method comprising:
   a) providing a visual display device including a holding device attached to headrest bars of the vehicle and a display arrangement attached to the holding device, where the headrest bars pass through respective clamping bores of the holding device, and the holding device includes a first connector attached to a second connector of the display arrangement;
   b) supplying the display arrangement with a source of data;
   c) removing the display arrangement from the holding device by detaching the second connector from the first connector, where after removal the holding device remains attached to the headrest bars;
   d) transporting the display arrangement to a location separate from the holding device; and
   e) operating the display arrangement independently of the vehicle.

30. The method of claim 29, where operating the display arrangement includes operating an internal power source of the display arrangement.

31. The method of claim 30, where the internal power source is selected from the group consisting of a battery, a solar-power generation unit, a mechanically-operated power generation source, a wind-up crank-actuated power generator, and a portable fuel cell unit.

32. The visual display unit of claim 1, where the first connector and the second connector include respective electrical connectors.

33. The visual display unit of claim 32, where the first connector and the second connector further include respective plug-type guides.

34. The visual display unit of claim 1, where the display arrangement includes an actuatable release device configured to detach the first connector from the second connector.

35. The visual display unit of claim 34, where the release device includes a lever and a cam movable by actuation of the lever, and the cam is configured for separating the first connector from the second connector.

36. The visual display unit of claim 1, where the portable display module includes a recess, the coupling arrangement includes a bearing projection pivotably engaged with and removable from the recess, and the display arrangement is pivotable toward and away from the holding device about a pivoting axis of the recess.

37. The visual display unit of claim 36, where the bearing projection is disposed at an end of the coupling arrangement at a distance from the first connector, and the second connector is pivotable toward and away from the first connector about the pivoting axis.

38. The visual display unit of claim 36, where the display arrangement includes a base module and a pivoting joint pivotably connecting the base module with the portable display module about a pivoting axis parallel to the pivoting axis of the recess.

39. The visual display unit of claim 38, where the second connector is interposed between the pivoting joint and the recess of the portable display module.

40. The method of claim 24, where the power is provided with the at least one cable.

41. The method of claim 23, where the power is provided with at least one cable alongside or through at least one of the headrest bars.

42. The method of claim 29, where removing the display arrangement from the holding device includes unplugging the second connector from the first connector.

43. The method of claim 29, where removing the display arrangement from the holding device includes decoupling an electrical connector of the second connector from an electrical connector of the first connector.

44. The method of claim 29, where removing the display arrangement from the holding device includes actuating a release drive to disengage the second connector form the first connector.

45. The method of claim 29, where the display arrangement is attached to the holding device at a pivot location separate from the first connector, and removing the display arrangement from the holding device further includes, after detaching the second connector from the first connector, moving the second connector through an angle away from the first connector by pivoting the display arrangement at the pivot location, and removing the display arrangement from the pivot location.

46. The method of claim 29, where the display arrangement includes a portable display module and a base module connected to the portable display module at a pivoting joint, and further including, after removing the display arrangement from the holding device, pivoting the portable display module away from the base module and placing the base module on a surface, and where the base module supports the portable display module in an upright viewing position while operating the display arrangement independently of the vehicle.

47. The visual display unit of claim 4, where the display arrangement comprises a base module pivotably connected with the portable display module along a mutual side, forming a pivoting axis and joint.

48. The method of claim 44, where the display arrangement is attached to the holding device at a pivot location separate from the first connector, and removing the display arrangement from the holding device further includes, after detaching the second connector from the first connector, moving the second connector through an angle away from the first connector by pivoting the display arrangement at the pivot location, and removing the display arrangement from the pivot location.

49. The method of claim 48, where the display arrangement includes a portable display module and a base module connected to the portable display module at a pivoting joint, and further including, after removing the display arrangement from the holding device, pivoting the portable display module away from the base module and placing the base module on a surface, and where the base module supports the portable display module in an upright viewing position while operating the display arrangement independently of the vehicle.

50. The method of claim 44, where the display arrangement includes a portable display module and a base module connected to the portable display module at a pivoting joint, and further including, after removing the display arrangement from the holding device, pivoting the portable display module away from the base module and placing the base module on a surface, and where the base module supports the portable display module in an upright viewing position while operating the display arrangement independently of the vehicle.

51. The method of claim 45, where the display arrangement includes a portable display module and a base module connected to the portable display module at a pivoting joint, and further including, after removing the display arrangement from the holding device, pivoting the portable display module away from the base module and placing the base module on a surface, and where the base module supports the portable display module in an upright viewing position while operating the display arrangement independently of the vehicle.

* * * * *